Figure 5:
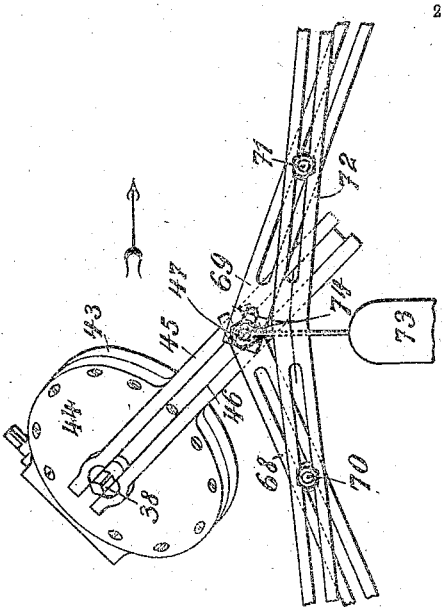

No. 831,234. PATENTED SEPT. 18, 1906.
G. NARDIN.
MACHINE FOR CUTTING TOOTHED GEARING.
APPLICATION FILED OCT. 12, 1904.
2 SHEETS—SHEET 1.
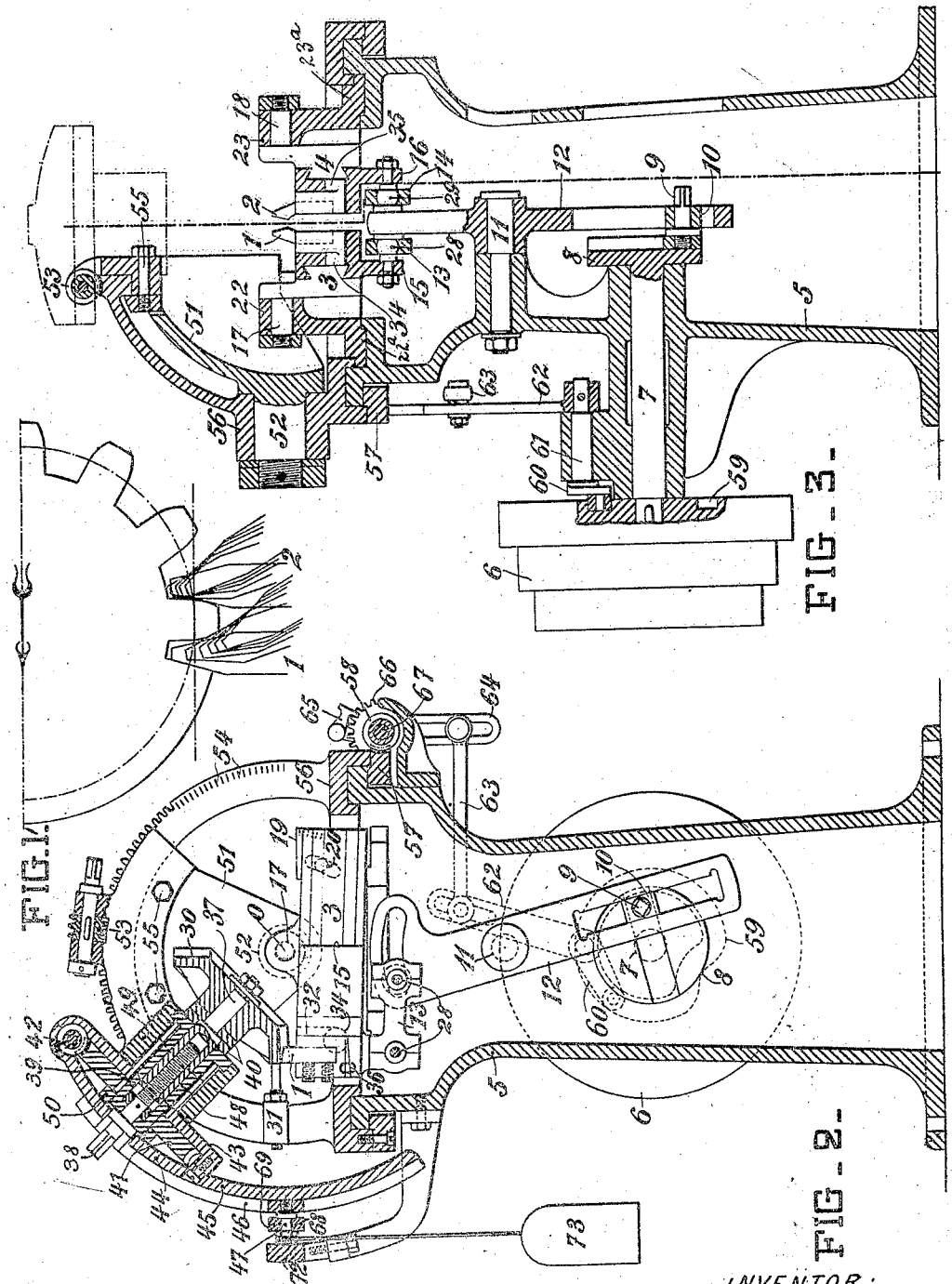
WITNESSES
Fred White
René Buine
INVENTOR:
Georges Nardin,
By his Attorneys
Arthur E. Fraser & Co.

No. 831,234. PATENTED SEPT. 18, 1906.
G. NARDIN.
MACHINE FOR CUTTING TOOTHED GEARING.
APPLICATION FILED OCT. 12, 1904.

2 SHEETS—SHEET 2.

WITNESSES:
Fred White
Regne Muine

INVENTOR:
Georges Nardin,
By his Attorneys
Arthur E. Fraser & Co.

UNITED STATES PATENT OFFICE.

GEORGES NARDIN, OF PARIS, FRANCE, ASSIGNOR OF ONE-HALF TO ATELIERS DE CONSTRUCTIONS MÉCANIQUES CI-DEVANT DUCOMMUN, OF MULHOUSE, ALSACE, GERMANY, A FIRM.

MACHINE FOR CUTTING TOOTHED GEARING.

No. 831,234.　　Specification of Letters Patent.　　Patented Sept. 18, 1906.

Application filed October 12, 1904. Serial No. 228,178.

*To all whom it may concern:*

Be it known that I, GEORGES NARDIN, engineer, a citizen of the French Republic, residing at Paris, France, have invented new and useful Improvements in Machines for Cutting Toothed Gearing, of which the following is a complete, clear, and exact specification.

This invention relates to improvements in machines for cutting toothed gearing, especially bevel-gearing.

The construction of the improved machine is based upon the known principle that all toothed wheels which roll correctly upon one and the same straight rack or a plane wheel gear accurately with one another. If now the rack or plane wheel be replaced by a shaping-tool of the form of one of the teeth thereof, in front of which the wheel-blank to be cut rolls, the said tool shapes or cuts out tooth-flanks of a shape corresponding to the diameter of the wheel-blank. Now it will be obvious that in cutting bevel-wheels in this manner only one flank can be cut at a time, as the spaces between the teeth on the inside of the toothed periphery are narrower than at the outside, and the flanks of the teeth converge to the geometrical apex of the cone. The successive cutting of the two flanks of the teeth is, however, tedious, and it is, furthermore, necessary to adjust and regulate the tool after the cutting of each flank. These disadvantages can be obviated by employing two cutting-tools, as in the case of certain bevel-wheel cutting-machines of the templet or pattern type, the said cutting-tools simultaneously shaping two tooth-flanks on the blank to be cut. In this method of cutting, however, the arrangement must be such that the shaping or cutting tools inclose between them a straight-sided tooth-space, so that there is provided practically a straight-flanked cutting-tooth space, the two tools being permanently adjusted and clamped with a constrained relative motion between them and the wheel transversely to the axis thereof for the purpose of forming the rolling toothed surfaces, so as to simultaneously shape both flanks of a tooth with the necessary convergence in the case of bevel-teeth. By this arrangement not only are the disadvantages attaching to the above-described method obviated, but, further, and what for this purpose cannot be underestimated, not only can the wheel be cut tooth by tooth with only a single adjustment of the cutting-tools, but by the simultaneous cutting of both flanks of a tooth the lateral pressures on the tools mutually compensate one another, (at any rate at the middle of the cutting period,) whereby the danger of a distortion of the wheel is diminished or completely obviated.

My invention provides, in connection with such cutting mechanism, means for obtaining a resultant rolling motion of the blank, such means including a blank-carrier having a bearing device for holding the blank, means for producing a transverse relative movement between the blank-carrier and cutters, means for rotating the blank, and means guiding the latter. Such guiding means preferably comprises two levers coöperating with the blank in such manner that the resultant motion imparted to the latter correctly rolls it past the cutters.

The accompanying drawings illustrate a suitable arrangement for carrying out the invention as applied to the cutting of bevel wheels.

Figure 4:
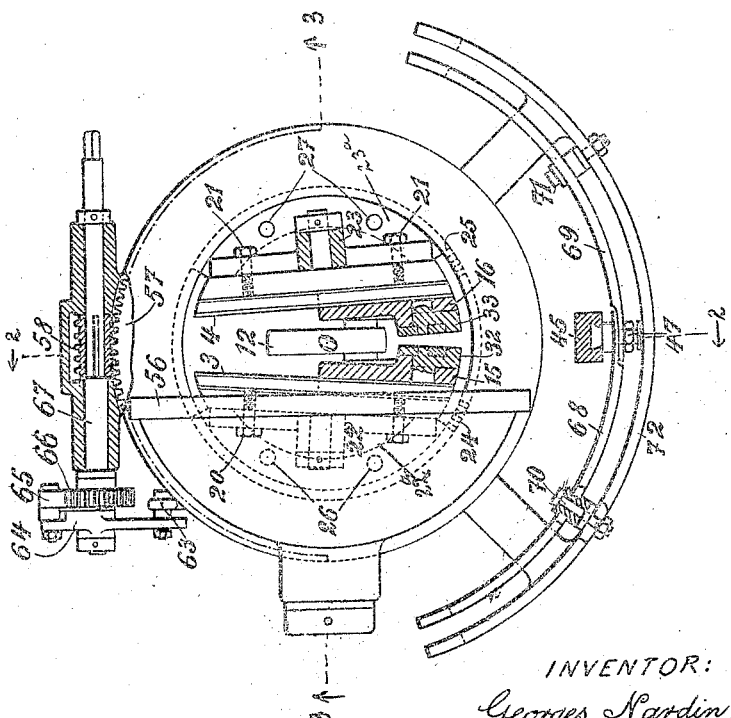

In the said drawings, Figure 1 is a view illustrating the mode of operation of the machine, which in general is based upon the principle of the known rolling method; but in lieu of showing the wheel in the different positions which it assumes in the course of one revolution relatively with the pair of cutting-tools, which would correspond to the arrangement illustrated, there are here shown for the sake of clearness the positions corresponding to the various depths of cut, which is the equivalent thereof as far as the consideration of the result to be attained is concerned. Figs. 2 and 3 are two vertical sections of the machine through two planes at right angles to one another. Fig. 4 is a plan view thereof, partly in horizontal section; and Fig. 5 is a detail view of a device for rolling the wheel-blank to be cut in front of the two adjusted shaping tools or cutters.

1 and 2 indicate the two shaping tools or cutters mounted in carriages, the said tools or cutters being arranged vertically in parallel planes, so as to provide between them a straight-sided tooth-space, Fig. 3. The carriage-guides 3 and 4 are adjustable in the vertical and horizontal planes around the common center line O of the system, toward which the axis of the gear to be cut is directed, so that they can be adjusted to the requisite inclination and to the correct angle of convergence with respect to one another and clamped in position, as hereinafter explained.

Outside the standard 5 is mounted the stepped pulley 6 upon the shaft 7, Figs. 2 and 3. The latter carries a disk 8, which has a crank-pin 9, with block 10, and oscillates the lever 12, mounted upon the pivot 11, the said lever reciprocating the tool-carriages 15 and 16 through the medium of the links 13 and 14, respectively. The two carriage-guides 3 and 4 are rotatable about the pivots 17 and 18, whereby the points of the tools 1 and 2 can be so adjusted in height that they can attain the bases of the spaces on both sides of the tooth to be cut, Fig. 2. A scale 19, Fig. 2, facilitates this adjustment to the necessary angle, and bolts 20 21 serve to clamp the guides 3 and 4 after the adjustment has been effected, Figs. 2 and 4. The bearings 22 and 23 of the pivots 17 and 18 can be turned about the central line O in circular guides on the standard 5 by means of segmental feet 22ª and 23ª in such a manner that the two cutting edges of the tools can be adjusted so as to converge in accordance with the thickness of the tooth. Scales 24 and 25, provided at suitable points on the standard 5, facilitate this adjustment to the requisite angle and convergence, and bolts 26 and 27 serve for clamping the bearings 22 and 23 after the adjustment has been effected, Fig. 4. Since the carriages 15 and 16 do not move parallel to the lever 12, as will be best seen from Fig. 4, the joints 28 and 29 of the links 13 and 14 are in the form of universal joints, Fig. 3.

The tools 1 and 2 and their driving mechanism are so arranged that the said tools can operate upon the tooth from the inside toward the outside—that is to say, from the smaller to the larger diameter—whereby a smooth engagement and motion are obtained, as in this manner the cross-section of the shaving gradually increases. Furthermore, this arrangement enables the wheel-blank 30 to be supported externally at the bottom by a support 31 when thicker shavings are being cut, Fig. 2. The shaping-tools are held in holders 32 and 33, which are pivoted upon pins 34 and 35. On the return motion of the tool-carriages these tool-holders can yield, while on the forward or working stroke they are brought into the operative position by springs 36 and are held in this position against rigid supports. By this construction of tool-holder the removal of the tools is avoided as much as possible. The cutters themselves are of simple and strong shape.

The blank 30 to be cut is centered upon the pivot 37, Fig. 2, which is inserted in the bush 39, the blank being then pressed tightly against the latter by the screw 38.

40 indicates adjusting-washers introduced between the blank and the bush. The said bush is connected to the wheel 41 of the division device, the division-worm 42 of which is here arranged to be operated by hand, although it can be provided with an automatic drive and is carried by the casing 43, inclosing the division-wheel 41. The upper part 44 of the casing 43 carries an arm 45, extending downward and formed with a longitudinal groove 46, in which is adjustably fitted a pin 47, adapted to be locked in any position in the said slot, Figs. 2 and 4. The casing 43 also carries a boss 48, which can turn in the socket 49 and is secured in position by means of a nut 50. The socket 49 is carried by a sector-shaped bearing-bracket 51, which can turn upon a pivot 52 and can be adjusted, by a worm 53 engaging the toothed periphery of the blank-carrier 56, with the assistance of a scale 54, to the angle of the wheel to be cut, the axis of which must obviously pass through the middle point O. Screws 55 are employed for clamping the bearing 51 in position after the adjustment is effected. The blank-carrier 56, which carries the bearing 51 by the pin 52, is itself rotatably mounted upon the column 5 and can be turned by the worm-wheel 57 and worm 58. This worm 58 is during the operation of the machine actuated by suitable ratchet mechanism 64, 65, and 66, Figs. 2, 3, and 4, the lever 64 of which is reciprocated from the driving-pulley 6, which for this purpose is provided with a heart-shaped groove 59 through the medium of the lever 60, shaft 61, lever 62, and rod 63, this reciprocating motion being communicated by the pawl 65 to the ratchet-wheel 66, mounted upon the spindle 67 of the worm 58. This ratchet mechanism has for its object to intermittently move the carrier 56 with the wheel-blank 30 relatively with the tools 1 and 2 and in a direction transverse to the axis thereof, so that the blank is moved step by step from a position on one side of the tools to a position on the other side in order during this movement to be subjected to the cutting action of the tools 1 and 2. After each complete stroke or to-and-fro movement of the tools the blank-carrier 56, and thereby the wheel-blank, is moved forward one step. For the requisite shaping of the teeth of the wheel it is, however, necessary that the blank shall simultaneously with this intermittent movement also intermittently turn—that is to say, shall gradually roll—with respect to the tools. This is necessary for giving the teeth the proper profile. For this purpose the following device is provided.

As is well known, a point on a circle which rolls along a flat path describes a cycloid, the centers of curvature of which form its evolute. In order now to obtain a correct rolling of the wheel-blank without complicating the construction of the machine, circularly-curved slotted fork-levers 68 and 69, Figs. 4 and 5, are provided with their supporting-pivots 70 and 71 adjustably secured symmetrically to the center 74 of curved slotted rail 72, fitted to the standard 5 and representing the evolute of a cycloid. The slotted levers 68 69 are mounted on sockets, Fig. 4, supported on the pivots 70 71, respectively, and to which they are detachably coupled—for example, by means of a set-screw—so that the said levers can swivel through the sockets on the supporting-pivots 70 71. The forked ends of the levers 68 69 embrace the pin 47, secured to the arm 45 at the height of the pitch-circle of the wheel, and are loaded with a weight 73, which tends to depress said levers 69 and 70. If now the blank-carrier moves circularly, so that the upper end of the axis 38 of the wheel-blank 30 moves in a horizontal plane from left to right in the direction of the arrow in Fig. 5, the lever-arm 45, on which is adjusted the pin 47, tends to oscillate to the left under the action of the weight 73, which draws the pin 47 downward, such pin being guided by the lever 68, swiveling on its pivot 70, which is firmly secured to the supporting-rail 72. The pin 47 lies in the inner portion of the fork of the lever, so that it is constrained to describe a circular arc-like curve representing substantially a descending portion of a cycloid which is the geometrical path of the pin 47, indicated by the left-hand curved line in Fig. 5. Of course the lever 69, which also engages the pin 47, is moved downwardly by the latter. In this way the intermittent transverse circular movement of the blank-carrier 56, in conjunction with the downward movement of the weight acting against the lever-arm 45, which tends to rotate the wheel-blank, results in an intermittent rolling motion of the casing 43 and the wheel-blank carried thereby. On arriving at the point 74 the guide-pin 47 is held between the two guide-levers 68 69, and as the circular movement of the blank-carrier 56 continues step by step in the same direction the said guide-pin 47 is then forced to rest against the guide-lever 69, by which it is guided so as to describe substantially the rising symmetrical portion of the cycloid, the guide-lever 68 being released. It is to be noted that the adjustment of the pivots 70 and 71 on the supporting-rail 72 depends upon the position of the pin 47 relatively with the wheel-axis (see Figs. 2 and 5)—that is to say, on the diameter of the wheel to be cut—since the geometrical rolling circle becomes greater or smaller, and consequently the curvature of the path of the guide-pin 47 varies in accordance therewith.

The operation of the machine is, shortly, as follows: After the blank 30 to be cut is secured in position and adjusted to the proper angle by the worm 53, with the assistance of the scale 54, the guide-pin 47 is secured in the pitch-circle of the wheel-blank, Fig. 2—that is to say, at the point 74, Fig. 5—when the arm 45 is vertical. The supporting-pivots 70 and 71 of the guide forked levers 68 and 69 are then secured in the proper position and the wheel 30, by turning the blank-carrier 56 by means of the hand-operated worm 58, is rolled until it lies within reach of the operating-tools. The tools 1 and 2 are then secured in the proper level position in their holders and the guides 3 and 4 of the tool-carriages are adjusted and secured in positions according to the depth and thickness of the teeth to be cut. If now the machine be started, the blank-carrier 56 is intermittently turned, through the medium of the ratchet mechanism 64 65 66 and the worm-gear 57 58, so that the wheel-blank 30 is gradually rolled more and more over the reciprocating tools, which latter simultaneously cut out in the blank two spaces, leaving between them a shaped tooth, Fig. 1. When a tooth is cut in this manner, the blank, by the backward rotation of the blank-carrier 56, (which is effected by hand or otherwise,) is returned to its normal position, rotated through one division, by means of the worm 42 of the division device and again operated for the cutting out of the next tooth, and so on. For larger wheels it is advantageous to arrange the support for the wheel to be cut in guides on the bearing 51, so as to be able to slide and be adjusted, together with the wheel, with respect to the common center, this arrangement being used as a substitute for the adjustment by means of the washers 40. In the case of cutting spur and screw wheels the guides for the tool-carriages are arranged parallel to one another, while the rolling of the blank to be cut remains in principle the same as above described, but takes place along a straight line. In this case the supporting-spindle for the blank to be cut may be arranged horizontally and held by a carrier, which instead of turning about the center O of the machine may be displaced in a plane perpendicular to the supporting-spindle, the parts 68 69 72 being obviously also of straight configuration.

What I claim is—

1. A machine for cutting toothed wheels, chiefly bevel-wheels, on the rolling principle, having two simultaneously-reciprocating cutters or tools arranged to provide between them a straight flanked tooth-space, means for guiding said cutters, means for imparting a to-and-fro movement to said cutters, a movable blank-carrier having a bearing device for rotatably supporting the blank, means for producing an intermittent transverse relative movement between the blank-carrier and the cutters, independent means for rotating the blank on its bearing device during such relative transverse movement, a lever-arm connected to the blank and provided with a guide-pin at the height of the pitch-circle of the wheel to be cut, and two guide members arranged on opposite sides of the vertical plane of the cutters, said guide members engaging said guide-pin, and each being adapted to guide it in an arc-like path so as to obtain a resultant rolling motion of the blank, substantially as set forth.

2. A machine for cutting toothed wheels, chiefly bevel-wheels, on the rolling principle, having two simultaneously-reciprocating cutters or tools arranged to provide between them a straight flanked tooth-space, independently-adjustable means for guiding said cutters, means for imparting a to-and-fro movement to said cutters, a movable blank-carrier having a bearing device for rotatably supporting the blank, means for producing an intermittent transverse movement of the blank-carrier relatively to the path of the cutters, independent means for rotating the blank on its bearing device during such transverse movement of the blank-carrier, a lever-arm connected to the blank and provided with a guide-pin at the height of the pitch-circle of the wheel to be cut, and two guide-levers arranged on opposite sides of the vertical plane of the cutters, said guide-levers engaging said guide-pin, and each being adapted to guide it in an arc-like path so as to obtain a resultant rolling motion of the blank, substantially as set forth.

3. A machine for cutting toothed wheels, chiefly bevel-wheels, on the rolling principle, having two simultaneously-reciprocating cutters or tools arranged to provide between them a straight flanked tooth-space, independently-adjustable means for guiding said cutters, means for imparting a to-and-fro movement to said cutters, a movable blank-carrier having a bearing device for rotatably supporting the blank, means for producing an intermittent transverse movement of the blank-carrier relatively to the path of the cutters, independent means for rotating the blank on its bearing device during such transverse movement of the blank-carrier, a lever-arm connected to the blank and provided with a guide-pin at the height of the pitch-circle of the wheel to be cut, two guide-levers arranged on opposite sides of the vertical plane of the cutters, said levers engaging said guide-pin, and a supporting-rail on which said guide-levers are adjustably pivoted, said levers each being adapted to guide said pin in an arc-like path so as to obtain a resultant rolling motion of the blank, substantially as set forth.

4. A machine for cutting toothed wheels, chiefly bevel-wheels, on the rolling principle, having two simultaneously-reciprocating cutters or tools arranged to provide between them a straight flanked tooth-space, independently-adjustable means for guiding said cutters, means for imparting a to-and-fro movement to said cutters, a movable blank-carrier having a bearing device for rotatably supporting the blank, means for producing an intermittent transverse movement of the blank-carrier relatively to the path of the cutters, independent means for rotating the blank on its bearing device during such transverse movement of the blank-carrier, a lever-arm connected to the blank and provided with an adjustable guide-pin, two guide-levers arranged on opposite sides of the vertical plane of the cutters, said levers engaging said guide-pin, and a supporting-rail on which said guide-levers are adjustably pivoted, each of said levers being designed to guide said pin in an arc-like path so as to obtain a resulting rolling motion of the blank, substantially as set forth.

5. A machine for cutting toothed wheels, chiefly bevel-wheels, on the rolling principle, having two simultaneously-reciprocating cutters or tools arranged to provide between them a straight flanked tooth-space, independently-adjustable means for guiding said cutters, means for imparting a to-and-fro movement to said cutters, a movable blank-carrier having a bearing device for rotatably supporting the blank, means for producing an intermittent transverse movement of the blank-carrier relatively to the path of the cutters, a lever-arm connected to the blank and provided with a guide-pin at the height of the pitch-circle of the wheel to be cut, a suspended weight on such guide-pin and having a tendency to rotate the blank on its bearing device, and two forked guide-levers arranged on opposite sides of the vertical plane of the cutters, each of such levers engaging said guide-pin and being adapted to guide it in an arc-like path so as to obtain a resulting rolling motion of the blank, substantially as set forth.

In witness whereof I have hereunto signed my name, this 26th day of September, 1904, in the presence of two subscribing witnesses.

GEORGES NARDIN.

Witnesses:
JOHN BAKER,
GEORGE E. LIGHT.